May 22, 1951 A. G. McNEILL 2,554,044
FALSE TEETH CARRIER
Filed Oct. 19, 1948
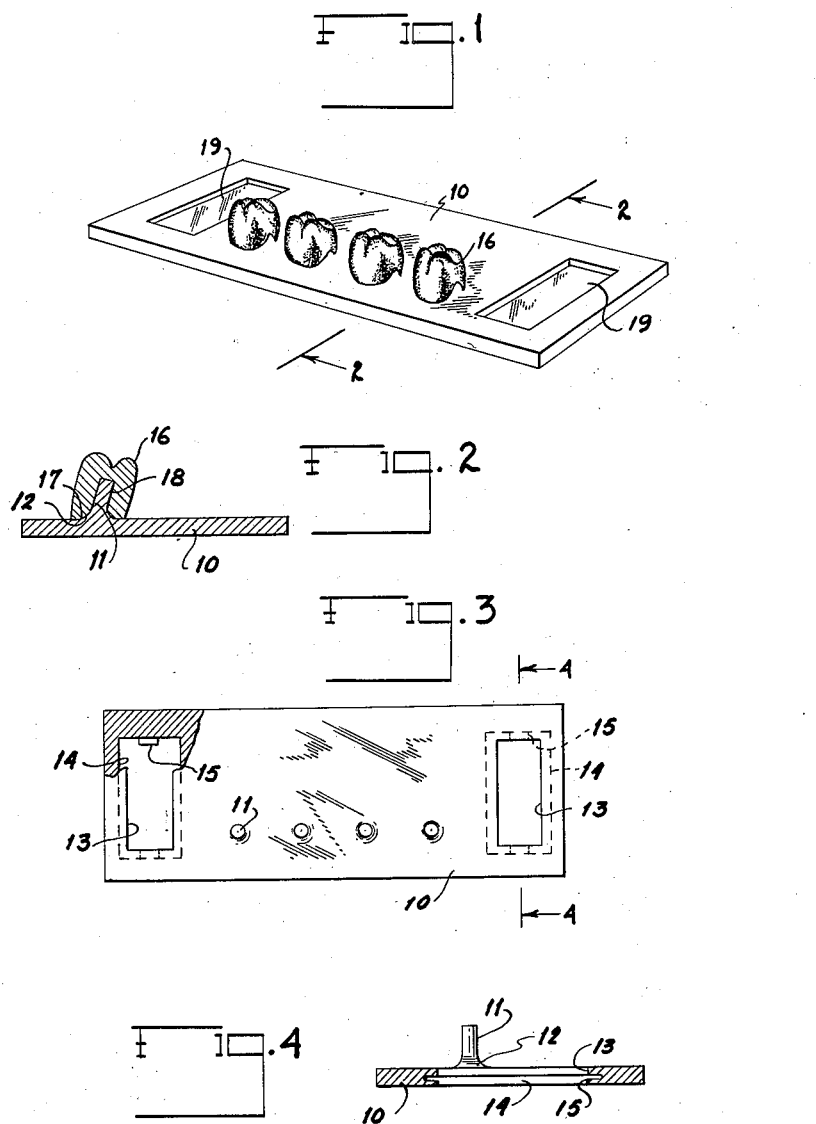
Inventor
Albert George McNeill
By Joshua R. H. Potts
His Attorney Patented May 22, 1951

2,554,044

UNITED STATES PATENT OFFICE 2,554,044

FALSE TEETH CARRIER

Albert George McNeill, Philadelphia, Pa., assignor to Bachmann Bros. Inc., Philadelphia, Pa., a corporation of Pennsylvania Application October 19, 1948, Serial No. 55,336

2 Claims. (Cl. 206—83)

The present invention deals with a carrier designed to hold a plurality of false teeth and is concerned primarily with carriers of the type used by manufacturers in distributing their products to dentists.

At the present time, it is common practice for a manufacturer of false teeth to sell certain types of teeth in sets which may vary in number. As a matter of convenience, the teeth of each set are usually positioned in a detachable manner on a carrier so that the individual components thereof are conveniently accessible to the dentist. However, in the carriers heretofore provided, considerable inconvenience has been experienced due to the fact that the teeth are not securely held on the carrier.

With the foregoing condition in mind, the present invention has in view as its foremost objective, the provision of a carrier which is adapted to retain the several false teeth of a set securely in position thereon.

More in detail, the invention has as an object the provision of a false teeth carrier of the type indicated which comprises a base which is made from an appropriate rubbery composition and which has formed integrally therewith a plurality of projections arranged in spaced relation thereon.

Certain types of false teeth such as the molars are ordinarily manufactured with a tubular opening or recess which assumes an angular relation with respect to the base of the tooth. In accordance with this invention, the projection on the carrier is received in this tubular opening with a frictional fit to securely hold the tooth in position thereon.

At first glance it might appear that the more desirable arrangement would be to have the projections of the carrier assume an angular relation with respect to the base which corresponds to the angle of inclination of the openings of the teeth. However, it has been found that with such an arrangement there is not sufficient friction to securely hold the teeth in position.

Another highly important object of the present invention is to provide, in a carrier of the type indicated, a base and projections integrally cast from a rubbery material with the projections substantially normal to the base. When a tooth is positioned over such a projection, the latter is deformed, due to the angle of inclination of the opening in the tooth and the tendency of the projection to return to its original position generates friction which securely holds the tooth in position.

Various other more detailed objects and advantages of the invention such as arise in connection with carrying out the above noted ideas in a practical embodiment will in part become apparent, and in part be hereinafter stated as the description of the invention proceeds.

The invention therefore comprises a carrier for false teeth which consists of a base of a rubbery material and having a series of projections formed integrally therewith and arranged substantially normal to the base.

For a full and more complete understanding of the invention, reference may be had to the following description and accompanying drawing wherein:

Figure 1 is a perspective view of a carrier designed in accordance with the precepts of this invention and shown as carrying a plurality of false teeth.

Figure 2 is a vertical transverse section through the carrier shown in Figure 1, and is taken about on the plane represented by the line 2—2 of Figure 1.

Figure 3 is a top plan view of the carrier per se with a part broken away and shown in section, and Figure 4 is another transverse section through the carrier taken about on the plane represented by the line 4—4 of Figure 3.

Referring now to the drawing wherein like reference characters denote corresponding parts, and first more particularly to Figures 3 and 4, the carrier of this invention is illustrated as comprising a base 10 which preferably assumes the rectangular formation illustrated and from which upstands a plurality of projections 11 which are arranged in spaced relation. These projections 11 are preferably formed integrally with the base 10 and each projection includes an enlarged portion 12 at its lower end where it merges in with the material of the base 10.

A highly important feature of the invention is the rubbery nature of base 10 and projections 11. This property is important because it permits the projection 11 to be deformed from the perpendicular position illustrated and exhibit a tendency to return to this position. Furthermore, it assures of a snug fit of each projection in the tooth opening as will be later described.

It has been found that the carrier and projections may be made from a polythene which is a plastic composition produced by the Du Pont Company and available on the market as such, or it may be made from an appropriate rubber composition which has the desired elastic qualities.

As shown in the drawings, there are four of these projections 11. Obviously this is intended as no limitation of the invention as the number may be varied within a wide range without departing from the spirit of the invention.

It is common practice in the field of merchandising false teeth to accompany each set with certain indicia or labels. In order to adapt the carrier 10 for the detachable positioning of such labels, a rectangular opening 13 is formed in each end. This opening is enlarged on the face opposite to that from which the projections 11 extend as represented at 14. A pair of tabs 15 extend into the opening and are adapted to function as retainers for a card or label which may be fitted into the enlarged opening 14 in an obvious manner.

Referring now more particularly to Figure 2, a false tooth of the molar type is shown at 16. This tooth has a base represented at 17 and is formed with an opening 18 which extends into the body of the tooth from the base 17 and at an acute angle with respect to the base 17.

When a tooth 16 is positioned over one of the projections 11 it will be pushed downwardly until the base 17 engages the face of the base 10. This causes the projection 11 to be deformed from its original position in which it was normal to the base 10. As the tooth and base are made from a rubbery material having elastic properties, the projection 11 will exhibit a tendency to return to its normal position. This generates friction which securely holds the tooth in position on the base.

Figure 1 shows the carrier as having a tooth 16 arranged on each of the projections 11 and a label 19 positioned beneath each of the openings 13. This completes the set which will be offered by the manufacturer for sale to dentists.

While a preferred specific embodiment of the invention is hereinbefore set forth, it is to be clearly understood that the invention is not to be limited to the exact constructions and materials illustrated and described because various modifications of these details may be provided in putting the invention into practice within the purview of the appended claims.

What is claimed is:

1. The combination of a carrier comprising a flat base of rubbery material with a plurality of projections extending from one face thereof and which normally assume a position substantially perpendicular to said base and a plurality of false teeth corresponding in number to said projections, each of said teeth having a base and an opening extending into said tooth from said base at an acute angle with respect thereto; said opening receiving one of said projections with the base of said tooth in face to face engagement with said base about said projection whereby said projection is deformed from its normal perpendicular position.

2. The combination of a carrier comprising a flat base of rubbery material with a plurality of projections extending from one face thereof and which normally assume a position substantially perpendicular to said base and a plurality of false teeth corresponding in number to said projections, each of said teeth having a base and an opening extending into said tooth from said base at an acute angle with respect thereto; said opening receiving one of said projections with the base of said tooth in face to face engagement with said base about said projection whereby said projection is deformed from its normal perpendicular position, said base being formed with an opening adjacent one end and means for retaining a label in position in said opening.

ALBERT GEORGE McNEILL.

REFERENCES CITED

The following references are of record in the file of this patent:

UNITED STATES PATENTS

| Number | Name | Date |
|---|---|---|
| 1,204,043 | McDonough | Nov. 7, 1916 |
| 2,010,734 | Parker | Aug. 6, 1935 |
| 2,111,095 | Evans | Mar. 15, 1938 |